(12) United States Patent
Kini et al.

(10) Patent No.: US 8,549,108 B2
(45) Date of Patent: Oct. 1, 2013

(54) OPTIMIZED PREFETCHING OF COMPOUND DATA

(75) Inventors: Adityashankar Kini, San Carlos, CA (US); Vinay Perneti, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 188 days.

(21) Appl. No.: 13/249,177

(22) Filed: Sep. 29, 2011

(65) Prior Publication Data

US 2013/0086264 A1 Apr. 4, 2013

(51) Int. Cl.
*G06F 15/16* (2006.01)

(52) U.S. Cl.
USPC .......................... 709/218; 709/217; 709/219

(58) Field of Classification Search
USPC ......... 709/217, 218, 219, 231, 203; 370/390; 707/654; 725/32
See application file for complete search history.

(56) References Cited

U.S. PATENT DOCUMENTS

| | | | |
|---|---|---|---|
| 2009/0292819 A1* | 11/2009 | Kandekar et al. | 709/231 |
| 2010/0023582 A1* | 1/2010 | Pedersen et al. | 709/203 |
| 2010/0232431 A1* | 9/2010 | Sebastian | 370/390 |
| 2011/0296048 A1* | 12/2011 | Knox et al. | 709/231 |
| 2012/0005365 A1* | 1/2012 | Ma et al. | 709/231 |
| 2012/0084261 A1* | 4/2012 | Parab | 707/654 |
| 2012/0222065 A1* | 8/2012 | Prins et al. | 725/32 |

* cited by examiner

*Primary Examiner* — Le H Luu
(74) *Attorney, Agent, or Firm* — Park, Vaughan, Fleming & Dowler, LLP

(57) ABSTRACT

Access to compound data over a wide-area network is optimized by analyzing metadata within compound data to identify internal and external data streams to be prefetched. Upon receiving or intercepting a network packet including an access request for a data resource, metadata in this data resource is analyzed to identify associated data streams and their storage locations within and/or outside of the data resource. Data streams may be proactively or reactively prefetched. Proactive prefetching identifies and retrieves data streams or portions thereof likely to be accessed by a client based on attributes associated with the data resource. Reactive prefetching identifies portions of data streams associated with received access requests and retrieves additional portions of these data streams. Prefetched data streams or portions thereof are stored in a data storage on the same local network or near to the local network including the client.

22 Claims, 4 Drawing Sheets

OPTIMIZED PREFETCHING OF COMPOUND DATA

BACKGROUND

The present invention relates to the field of network storage devices in general and in particular to accelerating and optimizing the creation of files on remote network storage devices.

Many organizations include users at two or more locations, such as branch offices. To facilitate cooperation by their users, improve efficiency, and reduce organizational costs, organizations may connect two or more local-area networks (LANs) at different locations with each other via a wide-area network (WAN), such as the internet or a private WAN. This enables users at different locations to share data and applications. This also allows resources such as applications servers and data storage at a single or small number of locations to serve users at many other network locations.

However, WAN performance bottlenecks create problems when connecting network locations via WANs. WANs typically have lower bandwidth and higher network latency than LANs. WAN bandwidth limits the performance of data intensive operations over a WAN and WAN latency limits the rate that consecutive dependent operations over a WAN can be processed. Both of these factors can dramatically reduce users' application performance when operating over a WAN.

WAN optimization devices optimize network traffic to improve WAN performance in reading and/or writing data over a network. A WAN optimization device typically monitors users' network traffic to attempt to predict data likely to be requested by users. This predicted data is prefetched over the WAN and cached by the WAN optimization devices at the users' respective network locations, so that this data can be quickly accessed by users if requested. WAN optimization devices also typically compress data for communication over the WAN. The WAN optimization devices' prefetching, caching, and compression masks the bandwidth and latency limitations of WANs from users.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. Herein, the term "WAN optimization device" is used to refer to such devices and applications and "WAN optimization" is used to refer to such techniques.

Many software applications and file formats store multiple types of data and complex data structures in a single file or other type of container object. This is referred to herein as compound data. For example, a virtual machine application may access a disk image file representing the complete, block-by-block contents and structure of one or more virtual storage devices implemented by the virtual machine application. In another example, applications may create and manipulate files that include different types of objects or other data structures combined into a single compound data file. For example, a word processor document file may include text data and non-text elements such as spreadsheets and tables, and binary objects such as images. One example technology for implementing compound data sets and files includes the Microsoft Compound Document File Format and Object Linking and Embedding (OLE).

BRIEF DESCRIPTION OF THE DRAWINGS

The invention will be described with reference to the drawings, in which.

SUMMARY

An embodiment of the invention optimizes access to compound data by analyzing metadata within compound data to identify internal and external data streams to be prefetched. Upon receiving or intercepting a network packet including an access request for a data resource, an embodiment of the invention analyzes the access request to identify the data resource. If the access to the data resource can be optimized, an embodiment of the invention locates and accesses the metadata in this data resource. The metadata is analyzed to identify the data streams associated with this data resource and their storage locations within and/or outside of the data resource.

Once one or more associated data streams have been identified, an embodiment of the invention may proactively or reactively prefetch all or portions of these data streams. In proactive prefetching, an embodiment of the invention predicts which data streams or portions thereof are likely to be accessed in the near future by a client based on the identity and/or type of data resource, identity and/or type of application accessing the data resource, and/or other attributes such as the user or users associated with these access requests. This embodiment then prefetches these selected data streams or portions thereof and stores them in a data storage on the same local network or near to the local network including the client.

For reactive prefetching, an embodiment identifies the portions of at least one data stream associated with access requests received in one or more network packets. This embodiment then selects additional portions of these data streams and/or associated data streams that are logically adjacent or near the requested portions. If these logically adjacent portions are not stored in contiguous storage locations, an embodiment of the invention uses the metadata to identify their storage locations. This embodiment then prefetches these selected data streams or portions thereof and stores them in a data storage on the same local network or near to the local network including the client.

DETAILED DESCRIPTION

Figure 1A:
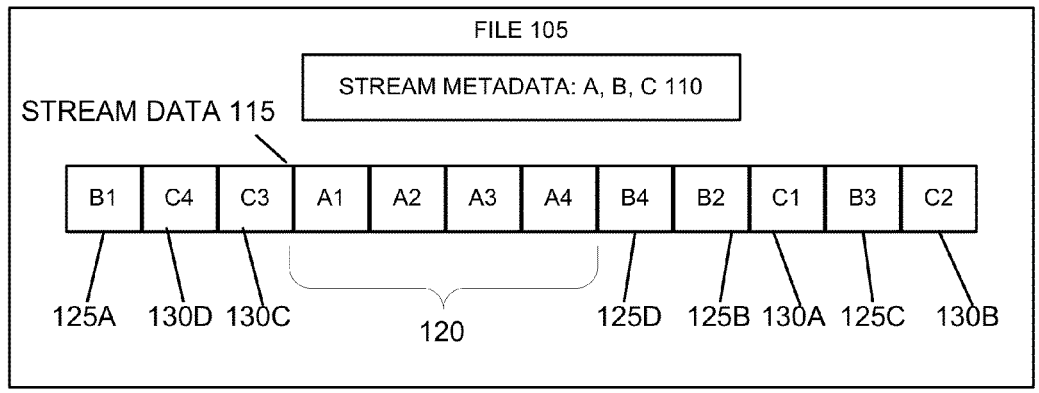
FIGS. 1A-1B illustrate example compound data files suitable for use with embodiments of the invention.
Figure 1B:
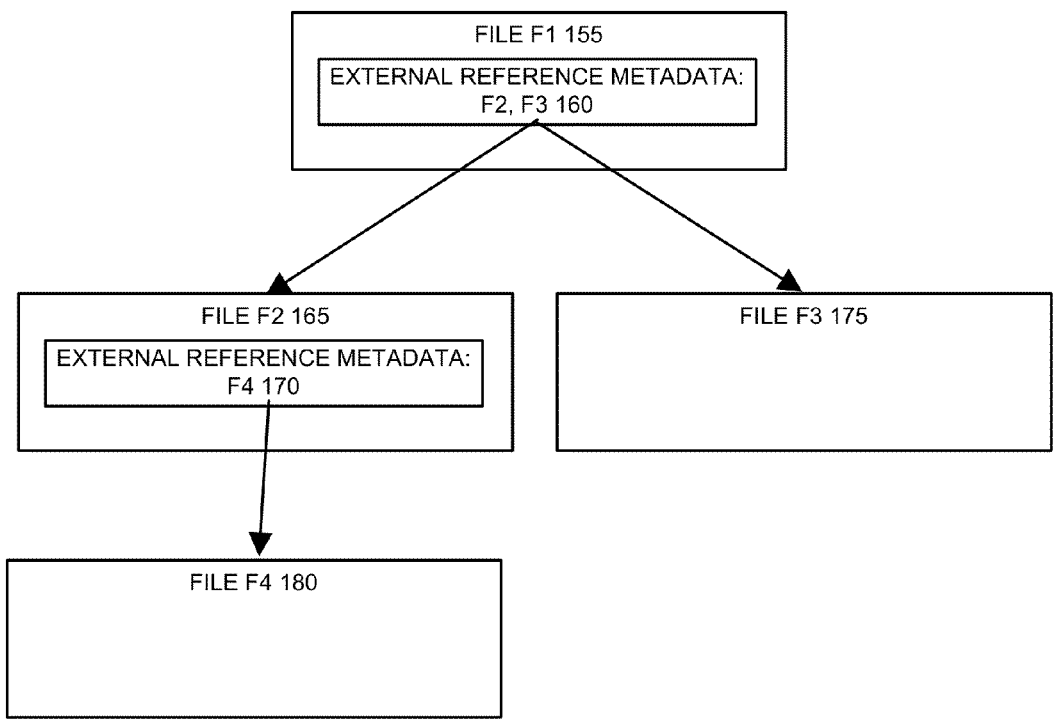

FIGS. 1A-1B illustrate example compound data files suitable for use with embodiments of the invention. FIG. 1A illustrates an example compound data file 105 with internal references. Compound data file 105 includes multiple objects or other types of structured or unstructured data, referred to as data streams. Each of the data stream represents one or more data objects embedded using Object Linking and Embedding (OLE), the Microsoft Compound Document File Format, and/or any other object serialization or data structure storage format.

Example compound data file 105 includes stream metadata 110. Stream metadata 110 identifies one or more of the streams embedded in the file 105. For example, a file using the Microsoft Compound Document File Format may have stream metadata in the form of a Sector Allocation Table (SAT), a Master Sector Allocation Table (MSAT), and/or a MiniFAT. In this particular example, the file acts as a container for a virtual file system for storing a flat or hierarchical arrangement of independent data streams. The stream metadata identifies the streams in the file and, in the case of a hierarchical arrangement, any relationships between two or more streams.

Additionally, stream metadata 110 may specify the storage locations of streams within the file 105. For each stream, the stream metadata may specify one or more storage locations, such as file offsets or storage block or sector addresses, containing the stream data. Stream data may arrange data streams in contiguous and/or non-contiguous storage locations. For example, stream metadata 110 specifies that file 105 includes at least three streams: A, B, and C. Additionally, stream metadata 110 specifies that stream A is stored in contiguous storage locations 120 and streams B and C are stored non-contiguously in storage locations 125 and 130, respectively.

FIG. 1B illustrates an example compound data file F1 155 with external references. Example compound data file F1 155 includes external reference metadata 160. External reference metadata 160 specifies one or more additional files or other types of data structures that are associated with data file F1 155. In this example, file F1 155 includes external reference metadata 160 that associates files F2 165 and F3 175 with file F1 155. Additionally, an associated file may include its own external reference metadata that further associates additional files. For example, file F2 165 includes external reference metadata 170 that directly associates file F4 180 with file F2 165, and thus indirectly associates file F4 180 with file F1 155.

Examples of compound data files with external reference metadata include source code files and computer-aided design (CAD) application files. For example, a source code file may include references to external and related source code and binary files, such as header files, compiled object code files, and static and dynamic library files. In another example, a CAD application file for a house may include references to external and related files including CAD files for component parts such as doors and windows, lists of bills of materials, and construction schedule files.

Embodiments of the invention may be used with files or other types of compound data sets including internal streams and/or external references to other files and/or other compound data sets. For example, a compound data file may include flat and/or hierarchical streams as well as references to external files.

Figure 2:
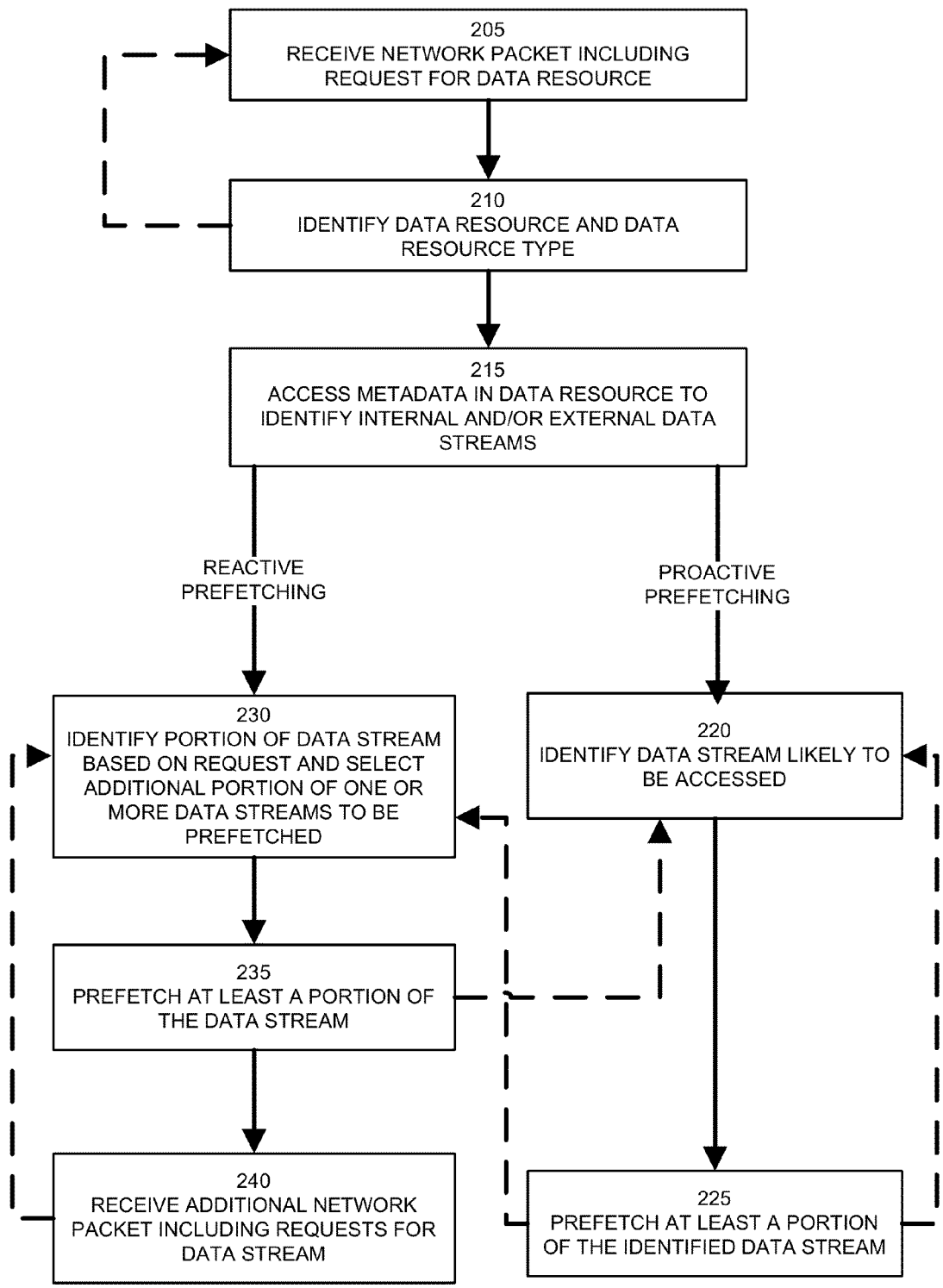
FIG. 2 illustrates a method of optimizing access to compound data over a WAN according to an embodiment of the invention.

FIG. 2 illustrates a method 200 of optimizing access to compound data over a WAN according to an embodiment of the invention. Step 205 receives a network packet from a client device including a request for access to a data resource. In an embodiment, step 205 intercepts network packets created by one or more client devices as they are in transit to a file server, database server, storage array network interface, or other provider of data storage. For example, network packets may be intercepted as they are communicated from their clients' local-area network to a wide-area network and/or as they are communicated from a wide-area network to a local-area network associated with their destination. An embodiment of step 205 uses deep packet inspection and/or other network packet analysis techniques to identify intercepted network packets that include requests for access to data resources. For example, an embodiment of step 205 may identify network packets that include data associated with the usage of a network file protocol. In a further embodiment, step 205 may identify not only the presence of an access request to data resources, but also any access parameters, such as options specified in a file open request. Once a network packet including a request for access to data resources has been distinguished from other types of network traffic, step 205 may forward some or all of the intercepted network traffic on towards its intended destination.

Step 210 identifies the specific data resource and the data resource type associated with the data access request. In an embodiment, step 210 uses deep packet inspection and/or other network packet and protocol analysis techniques to identify the specific data resource associated with the data access request. In a further embodiment, step 210 identifies whether the data resource is a compound data file or other type of compound data set. For example, step 210 may identify whether the data resource is a compound data file from a file extension associated with the name of the data resource. In another example, step 210 may access the contents of the data resource using a network file protocol or other data access protocol to identify the type of data resource.

An embodiment of the invention may be configured to optimize access to only specific types of data resources, data resources accessed only from specific applications, and/or data resources accessed by a specific user or group of users. In this embodiment, step 210 uses the identification of the data resource and data resource type and/or deep packet inspection and/or other network packet and protocol analysis techniques to determine if the access request for the data resource satisfies these criteria.

If the requested data resource is not a compound data set, not one of the types of data resources to be optimized, not accessed from a specified application, and/or not accessed by a specified user or group of users, method 200 proceeds back to step 205 to process further network packets.

Conversely, if the received network packet includes an access request for a compound data set, which optionally satisfies any configured criteria for data resource type, application, and/or user, step 215 accesses metadata in the data resource to identify any internal and/or external data streams. In an embodiment, step 215 accesses the data resource via a network file protocol to read a portion of the data resource including stream and/or external reference metadata. Depending on the type of data resource, step 215 may access the data resource at a predetermined location known to include this metadata and/or read and parse the some or all of the contents of the data resource to locate this metadata or directly locate the streams.

Once the metadata has been located, step 215 performs further analysis to identify the storage locations of some or all of the internal and/or external data streams. As described above, the storage locations of data streams within a compound data set may be in contiguous or non-contiguous storage locations. Step 215 may store a cached copy of the stream metadata or one or more data structures derived therefrom. This may be used to identify a data stream and a relative position within the data stream given a requested storage location in a file and vice-versa. Additionally, an embodiment of step 215 caches the names or other identifiers and storage locations of some or all of the external data streams referenced by the compound data stream. In a further embodiment, step 215 recursively analyzes the metadata of external data streams to identify further internal and/or external data stream and caches their storage locations as well.

Following step 215, embodiments of the invention may perform proactive prefetching and/or reactive prefetching. For proactive prefetching, method 200 proceeds to step 220. Step 220 identifies one or more internal and/or external data streams likely to be accessed in the near future following the received. Embodiments of step 220 may use heuristics or analysis of an application's prior behavior to identify data streams likely to be accessed. In a further embodiment, step 220 may rank or prioritize internal and external streams for prefetching. For example, if a word processor application opening a document file typically accesses streams A, C, D, and B, in that order, then step 220 may identify all or a portion of these streams for prefetching.

Following step 220, step 225 prefetches all or portions of the identified internal and/or external data streams. In an embodiment, step 225 accesses the data resource (and optionally any external data resources) via a network file protocol to read all or portions of the data stream. Step 225 then caches copies of all or the portions of the data streams in a WAN optimization device connected with the local-area network including the client device accessing the data resource. The WAN optimization device intercepts and analyzes further network traffic from the client device to determine if the client device is requesting access to any prefetched portions of the data streams. If so, then the WAN optimization device returns the requested data to the client device using its cached copy, rather than retrieving the requested data stream via the WAN from remote data storage.

For reactive prefetching, method 200 proceeds to step 230. Step 230 identifies at least an additional portion of at least this data stream likely to be accessed in the near future based on data streams and/or portion thereof previously requested by the client device.

For example, step 230 may assume that streams are accessed sequentially. In this example, step 230 identifies the relative logical location in the data stream corresponding with the storage location, such as an address or offset in a file, included in the access request. Step 230 may use the data structures previously created in step 215 to identify a data stream and a relative position within the data stream given a requested storage location in a file. Step 230 then selects one or more logically sequential or nearby positions in the data stream for prefetching. Because data streams may not be stored contiguously, logically sequential or nearby locations in a data stream may be stored in non-sequential and/or distant storage locations in the file. Thus, step 230 determines storage locations, such as addresses or offsets in a file, from the selected logical positions within the data stream using the data structures created in step 215.

In another embodiment, step 230 selects additional portions of the accessed data stream or other data streams based on heuristics or previous analysis of an application's prior behavior. These heuristics may be applied based on the types of data resource including the data stream, the name and/or type of data stream embedded or referenced by the data resource, the application used to access the data stream, the structure or arrangement of data streams in a data resource, the type of data access request and any associated access parameters, and/or a specific user or group of users accessing the data stream. For example, if a word processor often accesses text data in stream B of a document file followed shortly afterwards by accessing font data in stream D of this file, then step 230 may select all or a portion of stream D for prefetching upon receiving a request to access stream B of a document file.

Step 235 prefetches one or more selected data streams or portions thereof based on the selection of step 230. In an embodiment, step 240 accesses the data resource (and optionally any external data resources) via a network file protocol to read all or portions of the data stream. Step 240 then caches copies of all or the portions of the data streams in a WAN optimization device connected with the local-area network including the client device accessing the data resource.

Step 240 receives or intercepts additional network traffic from the client device that include requests for access to the data resource. In response to these additional requests, step 240 may return the requested data to the client device using its cached copy, if possible. Step 240 may retrieving the requested data stream via the WAN from remote data storage if the requested data has not been cached. Following step 240, steps 230 and 235 may be repeated to prefetch additional data based on these additional access requests.

Reactive and proactive prefetching may be used together or separately. Furthermore, the steps of both reactive and proactive prefetching may be repeated based on additional access requests and/or additional analysis and prediction of likely data access requests. Additionally, proactive prefetching may be performed in response to reactive prefetching. For example, an embodiment of the invention may automatically develop new heuristics or refine existing heuristics based on patterns of reactive prefetching. These new or refined heuristics may be applied to perform more effective proactive prefetching.

In still a further embodiment, method 200 may be used to optimize other operations in addition to or instead of reading data from compound data resources. Some applications may create or modify large numbers of files. For example, a compiler and other software development applications may process large numbers of source code files to produce corresponding object code or binary files. These object code or binary files are then linked together to form an executable application. A script or configuration data, such as a make file, is used to specify this sequence of operations.

In an embodiment, method 200 intercepts an access request to a make file or other configuration data. Method 200 then analyzes this make file to identify the externally referenced streams (e.g. source code files and object code files) and their sequence of processing by the compiler, linker, or other software development application. Method 200 may then perform proactive and reactive prefetching to optimize read access to these files. Additionally, method 200 may proactively or reactively create empty shell files in steps 220 and 235 for any new files to be generated during this process and cache their file handles or other access parameters. Upon intercepting a file creation request from a client for a file corresponding with one of these empty shell files, a WAN optimization device returns the cached file handle. This embodiment can be similarly extended to existing files that may be opened for modification. By pre-creating or pre-opening files based on external references in the make file or other configuration data, this embodiment of method 200 eliminates the latency from file creation or modification. If these pre-created or pre-opened files are not accessed by a client within a time period, a further embodiment deletes pre-created files and/or closes the pre-opened files to conserve data storage resources.

Figure 3:
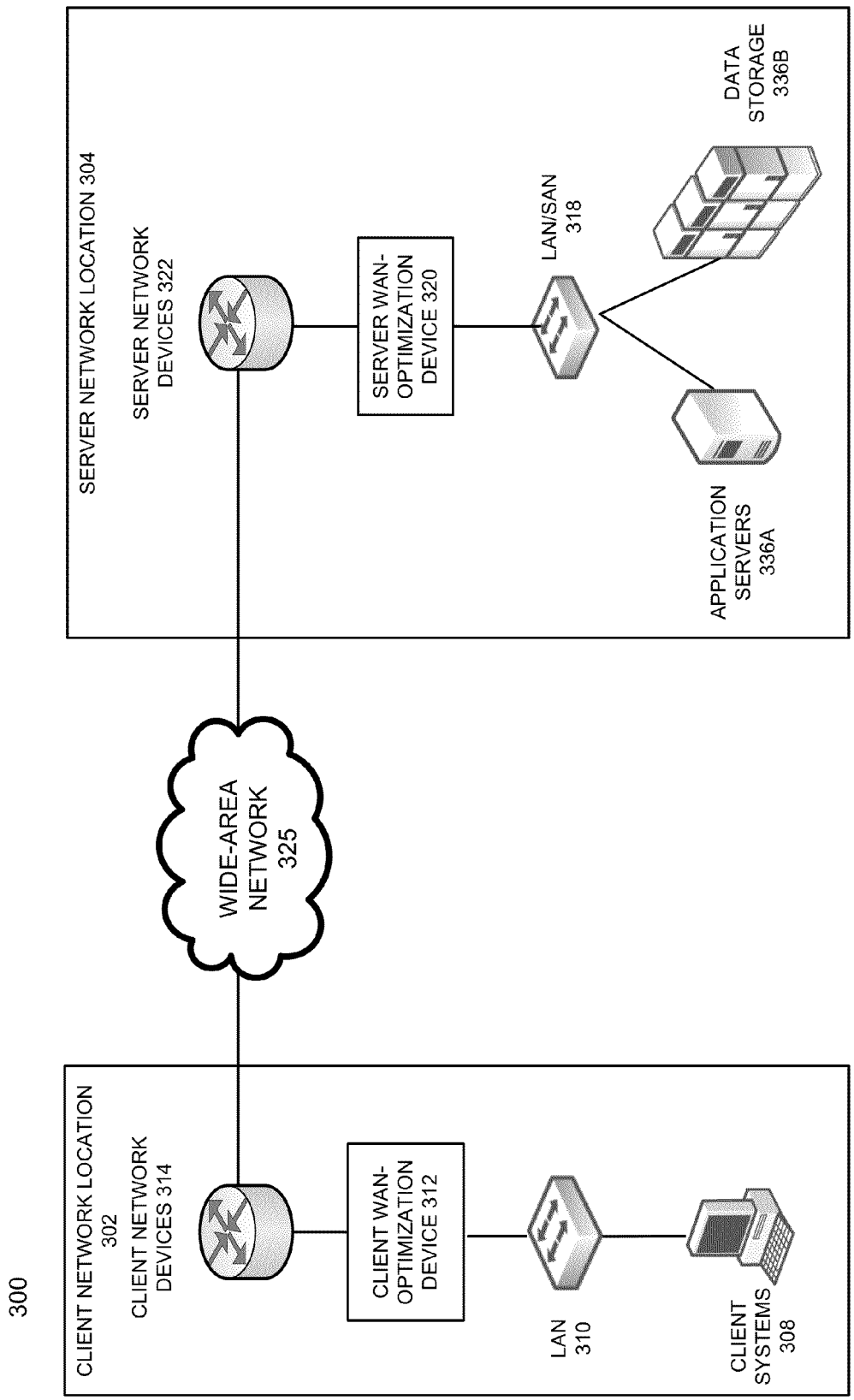
FIG. 3 illustrates an example configuration of WAN optimization devices suitable for use with embodiments of the invention.

FIG. 3 illustrates an example system 300 including WAN optimization devices suitable for use with embodiments of the invention. System 300 includes a client network location 302 and a server network location 304 connected via a wide-area network (WAN) 325, such as the Internet, an enterprise's internal WAN, or a service provider's fully controlled network. Client network location 302 includes one or more client computer systems 308, which can include desktop computers, laptop computers, rack-mounted or blade computers, and mobile computing devices such as smartphones, tablet computers, and any other type of electronic device capable of communicating via an electronic communications network. Client computers 308 are connected via a LAN network 310, which can include wired network interfaces, such as Ethernet, and wireless network interfaces, such as any of the 802.11 family of wireless network interfaces. System 300 and client network location 302, server LAN 318, and WAN 325 can use a variety of communications protocols, including Media Access Control protocols, such as Ethernet, Internet layer protocols such as IP, transport layer protocols such as TCP and UDP, as well as standard or proprietary application layer protocols such as HTTP, POP and SMTP, and DNS.

LAN network 310 can also include other network devices, such as hubs, switches, routers and other network traffic directing devices; storage-area network front-ends and interfaces; proxies, network-address translation (NAT) and firewall devices; wireless network devices such as access points, bridges, and repeaters; print-servers, and other network service provider devices; one-way or two-way streaming video, audio, video-conferencing, VOIP, and music servers; network logging and network management devices; and network monitoring and traffic inspection devices. These various devices at the client network location 302 are referred to generally as client network devices 314.

Client network location also includes a client-side WAN optimization device 312. As described above, client-side WAN optimization device 312 optimizes network traffic to improve WAN performance in reading and/or writing data over a network.

Server network location 304 includes one or more server computer systems 336, which can include one or more application servers 336a and one or more data storage systems 336b, as well as optional desktop computers, laptop computers, server computers, and mobile computing devices such as smartphones, tablet computers, and any other type of electronic device capable of communicating via an electronic communications network. Server computers 336 are connected via a LAN network 318, which can include wired network interfaces, such as Ethernet, and wireless network interfaces, such as any of the 802.11 family of wireless network interfaces. Server network location may also include a storage area network (SAN) 318 for accessing block data storage devices, such as storage arrays, using block storage protocols such as iSCSI or FCP.

Server network location 304 can also include other network devices, such as hubs, switches, routers and other network traffic directing devices; storage-area network front-ends and interfaces; proxies, network-address translation (NAT) and firewall devices; wireless network devices such as access points, bridges, and repeaters; print-servers, and other network service provider devices; one-way or two-way streaming video, audio, video-conferencing, VOIP, and music servers; network logging and network management devices; and network monitoring and traffic inspection devices. These various devices at the server network location 304 are referred to generally as server network devices 322.

Server network location 304 also includes a server-side WAN optimization device 320. Server-side WAN optimization device 320 operates in conjunction with one or more client-side WAN optimization devices, such as client-side WAN optimization device 312, to optimize network traffic to improve WAN performance in reading and/or writing data over a network. In alternate embodiments, server-side WAN optimization device 320 may be omitted.

Client-side WAN optimization device 312 may operate in a transparent manner to client systems 308 and/or other client network devices 314 while performing optimization of network traffic. For example, client-side WAN optimization device 312 may transparently monitor network traffic from client systems 308 to predict data likely to be requested by the client systems 308. This predicted data is prefetched and cached by the client-side WAN optimization device 312 over the WAN 325 from the server network location 304, so that this data can be quickly accessed by client devices 308 if requested. The client-side and server-side WAN optimization devices 312 and 320 also typically compress data for communication over the WAN 325. The WAN optimization devices' prefetching, caching, and compression masks the bandwidth and latency limitations of WANs from users.

It should be noted that client computers 308 and other network devices in client network location 302 may take on the roles of both clients or servers in network communications. Thus, client computers 308 and other network devices in client network location 302 may initiate network communications (acting as clients) and/or receive network communications initiated by other network devices (acting as servers). Similarly, server computers 316 and other network devices in server network location 304 may take on the roles of both clients or servers in network communications, initiating network communications (acting as clients) and/or receiving network communications initiated by other network devices (acting as servers).

Embodiments of the invention, such as method 200, may be implemented by a client-side WAN optimization device 312, a server-side WAN optimization device 320, or a combination of these two devices operating together. Other embodiments of the invention may be implemented by other stand-alone network devices or software applications executed by client systems 308.

Figure 4:
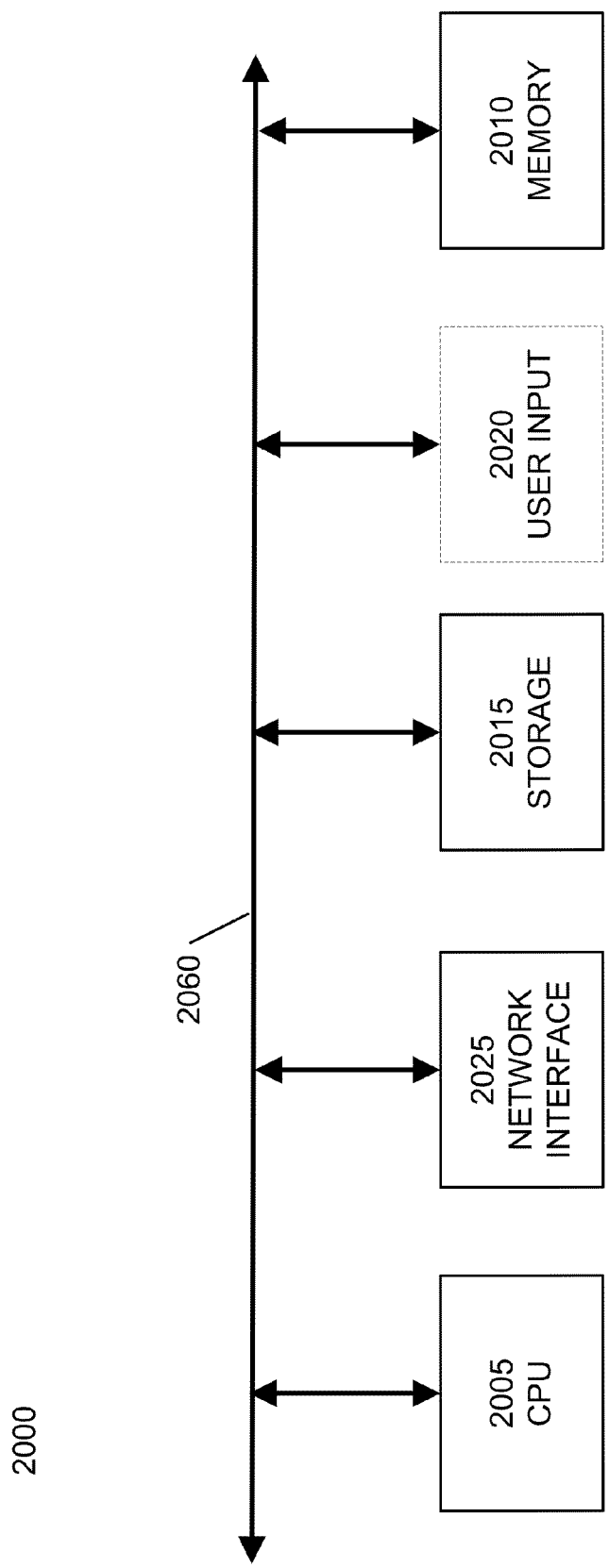
FIG. 4 illustrates an example computer system capable of implementing a transparent network device according to an embodiment of the invention.

FIG. 4 illustrates an example computer system capable of implementing a transparent network device according to an embodiment of the invention. FIG. 4 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of optimizing access to a data resource via a wide area network, the method comprising:
   receiving a network packet from a client on a first local network, wherein the network packet includes a request for access to a first portion of a data resource, wherein the data resource is stored in a data storage accessible via a wide-area network;
   accessing metadata associated with the data resource to identify at least a first data stream corresponding with the first portion of the data resource;
   selecting a second portion of at least one data stream based at least in part on the first data stream;
   retrieving the second portion of at least one data stream via the wide area network; and
   storing a copy of the second portion of at least one data stream in a second data storage connected with the first local network.

2. The method of claim 1, wherein the second portion of at least one data stream includes an additional portion of the first data stream.

3. The method of claim 2, wherein the additional portion of at least one data stream is logically contiguous with the first portion of the first data stream.

4. The method of claim 3, wherein the data resource includes first storage locations corresponding with the first portion of the first data stream and second storage locations corresponding with the additional portion of the first data stream, wherein the first and second storage locations are not contiguous.

5. The method of claim 1, wherein the second portion of at least one data stream includes a second data stream.

6. The method of claim 5, wherein the first and second data streams are included in the data resource.

7. The method of claim 5, wherein the first data stream is included in the data resource and the second data stream is included in a second data resource.

8. The method of claim 1, wherein selecting the second portion of at least one data stream based at least in part on the first data stream comprises:
   predicting at least one future access request from the client; and
   identifying the second portion of at least one data stream based on the predicted future access request.

9. The method of claim 8, wherein the predicted future access request is determined at least in part by analyzing the metadata to identify an attribute associated with the data resource.

10. The method of claim 9, wherein the attribute includes a type associated with the data resource.

11. The method of claim 9, wherein the attribute includes an application associated with the data resource.

12. The method of claim 9, wherein the attribute includes at least one user associated with the data resource.

13. The method of claim 1, wherein receiving the network packet from the client on a first local network comprises:
   intercepting the network packet in transit to the data storage.

14. The method of claim 13, wherein the network packet is intercepted on the first local network.

15. The method of claim 13, wherein the network packet is intercepted on a second local network connected with the wide-area network, wherein the second local network includes the data storage.

16. The method of claim 1, wherein the request for access to the data resource uses a network file protocol.

17. The method of claim 1, wherein the data resource includes a first file including the first data stream, wherein selecting the second portion of at least one data stream based on the first data stream comprises:
- determining if a second file associated with the second portion of at least one data stream exists in the data storage;
- in response to the determination that the second file does not exist, creating the second file in the data storage;
- wherein the second portion of at least one data stream retrieved via the wide area network includes an access parameter for the second file.

18. The method of claim 17, comprising:
- receiving a second network packet from the client, wherein the second network packet includes a request to create the second file; and
- in response to the second network packet, retrieving the stored copy of the second portion including the access parameter from the second data storage and communicating it to the client.

19. The method of claim 17, comprising:
- receiving a second network packet from the client, wherein the second network packet includes an access request for the second portion of at least one data stream; and
- in response to the second network packet, retrieving the stored copy of the second portion from the second data storage and communicating it to the client.

20. The method of claim 1, wherein storing the second portion is performed by a WAN optimization device in the first local network.

21. The method of claim 1, wherein storing the second portion is performed by a WAN optimization application executed by the client.

22. The method of claim 1, wherein the selecting of the second portion of at least one data stream is further based at least in part on an access parameter associated with a request for access to a first portion of a data resource.

* * * * *